United States Patent

Graf

(10) Patent No.: US 8,666,521 B2
(45) Date of Patent: Mar. 4, 2014

(54) METHOD FOR OPERATING AN AUTOMATION SYSTEM

(75) Inventor: Markus Graf, Rülzheim (DE)

(73) Assignee: Siemens Aktiengesellschaft, Munich (DE)

( * ) Notice: Subject to any disclaimer, the term of this patent is extended or adjusted under 35 U.S.C. 154(b) by 229 days.

(21) Appl. No.: 13/043,233

(22) Filed: Mar. 8, 2011

(65) Prior Publication Data

US 2011/0224809 A1  Sep. 15, 2011

(30) Foreign Application Priority Data

Mar. 9, 2010  (EP) .................................. 10155875

(51) Int. Cl.
*G05B 19/42* (2006.01)
*G05B 11/01* (2006.01)
*G06F 9/44* (2006.01)

(52) U.S. Cl.
USPC .................. 700/87; 700/18; 700/23; 700/86; 717/100; 717/122; 717/168; 715/229; 707/638; 707/695; 707/806

(58) Field of Classification Search
USPC .......... 700/18, 23, 86–87; 717/100, 120, 122, 717/124, 168–170; 707/638, 695, 806; 715/229
See application file for complete search history.

(56) References Cited

U.S. PATENT DOCUMENTS

| | | | | |
|---|---|---|---|---|
| 4,558,413 A | * | 12/1985 | Schmidt et al. | 717/170 |
| 5,835,911 A | * | 11/1998 | Nakagawa et al. | 1/1 |
| 6,996,818 B2 | | 2/2006 | Jacobi | |
| 7,415,707 B2 | * | 8/2008 | Taguchi et al. | 717/174 |
| 7,496,910 B2 | * | 2/2009 | Voskuil | 717/168 |
| 7,581,217 B2 | * | 8/2009 | Jhanwar et al. | 717/168 |
| 7,627,746 B1 | * | 12/2009 | Pulleyn et al. | 713/100 |
| 7,668,612 B1 | * | 2/2010 | Okkonen | 700/95 |
| 7,711,760 B2 | * | 5/2010 | Williams | 707/825 |
| 8,332,838 B2 | * | 12/2012 | Matlin et al. | 717/173 |
| 2002/0073410 A1 | | 6/2002 | Eriksson | |
| 2009/0193485 A1 | * | 7/2009 | Rieger et al. | 725/114 |
| 2009/0222806 A1 | * | 9/2009 | Faus et al. | 717/168 |
| 2010/0162352 A1 | * | 6/2010 | Haga et al. | 726/2 |

FOREIGN PATENT DOCUMENTS

| | | |
|---|---|---|
| CN | 1801092 A | 7/2006 |
| WO | WO 9856149 A1 | 12/1998 |
| WO | WO 9946676 A2 | 9/1999 |
| WO | WO 2004049115 A2 | 6/2004 |

* cited by examiner

*Primary Examiner* — Ramesh Patel
(74) *Attorney, Agent, or Firm* — Cozen O'Connor

(57) ABSTRACT

A method for operating an automation system which executes, as an automation solution, a control program having a plurality of software modules, where the method comprises replacing at least one software module comprising an old software module at the runtime of the control program with a new software module wherein the new software module is loaded into a memory of the automation system, an old data area associated with the old software module is compared with a new data area associated with the new software module, program code instructions for converting data for or from the old data area into data for or from the new data area is generated, and a program code instruction for invoking the old software module is replaced with program code instructions for invoking the generated program code instructions for data conversion and for invoking the new software module.

11 Claims, 8 Drawing Sheets

METHOD FOR OPERATING AN AUTOMATION SYSTEM

BACKGROUND OF THE INVENTION

1. Field of the Invention

The invention relates to a method for operating an automation system having a memory in which a control program is stored as an automation solution and, more specifically, to a situation such as arises when at the runtime of parts of the control program these parts of the control program have to be replaced with updated parts without the execution of the control program and overall operation of the automation system being noticeably interrupted. Such a replacement of parts of the control program is referred to as delta loading, where such parts of the control program are referred to in the following as software modules.

2. Description of the Related Art

The problems associated with delta loading have been the subject of discussion for a long time. At present, however, only solutions that can be used if no change is made to the interface of the respective software modules are available for automation systems. The reason for this is that such data resides sorted in a sequential manner in a data area assigned to the software module, referred to as the instance (DB). Consequently, if a data area is modified, the address locations of all the succeeding data are shifted. Due to the shifting of the address locations of following data areas, a loaded instance (DB) also cannot be extended without due consideration.

Accordingly, with the conventional solutions that are available, if a change or correction to a software module is made, which can only be accomplished by extending the data in the associated data area (new inputs or outputs or additional data), then at the present time the module can only be loaded into the automation system if the automation system is first transitioned to a stopped state, i.e., if the execution of the control program is interrupted. In an automation system that is in the stopped state there is consequently also an interruption to the control and/or monitoring of the respective technical process for the duration of the stopped state.

SUMMARY OF THE INVENTION

It is therefore, an object of the invention to provide a method for operating an automation system in which the aforementioned disadvantages are avoided or at least their impact is reduced.

This and other objects and advantages are achieved in accordance with the invention by a method for operating an automation system having an automation system that comprises one or more memories and one or more processing units, wherein a control program is stored in the memory as an automation solution that is executed by the processing unit. The control program comprises a plurality of software modules which are invoked (called) during the execution of the control program by a runtime group module also incorporated in the control program. The individual steps for replacing at least one software module comprising an old software module at the runtime of the control program with a new software module, i.e., a software module with modified interface, comprises comparing an old data area associated with the old software module with a new data area associated with the new software module, generating program code instructions for converting data for or from the old data area into data for or from the new data area, loading the new software module and the new data area, and replacing a program code instruction for invoking the old software module in the runtime group module with program code instructions for invoking the generated program code instructions for data conversion and for invoking the new software module.

By generating the program code instructions for converting data for the or from the old data area into data for the or from the new data area, it is ensured that the control program can continue to run with its software modules or other control programs not affected by the replacement. It is possible that such software modules or other control programs access the old data area of the old data module that is to be replaced. To ensure this data will also be accessible to the new software module, the data is transferred from the old data area into the new data area. Once the data is available in the new data area, the new software module can immediately take over the functionality of the replaced old software module.

If the new software module generates data that is relevant to other parts of the control program or other control programs, the generated data is stored in the new data area. At least initially, however, the remaining parts of the control program or other control programs access, not the new data area, but the old data area of the software module that is to be replaced. Consequently, to ensure that any data that may have been generated by the new software module is also available to the remaining parts of the control program or to other control programs, the program code instructions for data conversion also include copy instructions for transferring data from the new data area into the old data area. Once the data generated by the new software module is available in the old data area, the control program with its parts not affected by the replacement is also immediately able to process data generated by the new software module. The same applies to any other control programs.

The totality of program code instructions for the described data conversion is referred to in the following as a copy routine for short. To ensure that the copy routine can also become effective, provision is made for its invocation by that runtime group module which invokes the old software module or which previously invoked the old software module. Provision for invoking the new software module is also made in the runtime group module. The program code instruction for invoking the new software module takes the place of the previous call provided for invoking the old software module in the runtime group module. The generated copy routine is invoked from the runtime group module before and after the new software module is invoked, in particular immediately before and immediately after such an invocation; in fact the copy routine therefore comprises a first part and a second part. The runtime group module includes corresponding (call) program code instructions to invoke each copy routine. The data is copied over from the old data area into the new data area before the new software module is invoked by the first part of the copy routine. Similarly, the data is copied over from the new data area into the old data area by invoking the second part of the copy routine after the new software module has been processed.

The approach according to the invention therefore allows one or more software modules in a control program to be replaced without the need to interrupt the control program or other control programs. The control program can therefore be modified at runtime. When reference is made here to other control programs, this means, e.g., a control and monitoring program which is executed as a control program by an automation device provided as a control and monitoring system.

In a preferred embodiment, the control program is searched for program code instructions which relate to the old data area. Here, the search is preferably conducted, not in the control program of the automation system, but in a control program made available in an engineering system, i.e., a programming environment, or in the totality of all control programs of the automation system. The control program for the automation system is produced or changes are made to it in the engineering system, e.g., a software environment that typically runs on a programming device or the like. The search in the control program in the engineering system can be conducted faster than in the other automation devices of the automation system and above all without affecting them or it. A control program of the automation system can be a distributed control program, particularly when the automation system is also a distributed system, i.e., a system comprising a plurality of automation devices. If the automation system includes only one automation device, the terms automation system and automation device designate the same entity. If the automation system includes at least one automation device provided for control and monitoring purposes and at least one automation device provided as an operator control and monitoring device, the control program of the automation system comprises at least one control program for the at least one automation device and at least one control program for the at least one operator control and monitoring device. The scope of the term control program is therefore determined by the particular context.

Program code instructions found during the search of the control program are modified such that they relate to the new data area. Such a modification of the program code instructions of the control program can also be referred to as "mapping". The conversion allows the subsequent removal of the program code instructions for converting data from the old data area to the new data area. The program code instructions identified in the control program as relating to the old data area modified such that they relate to the new data area. As a result, there is no necessity to keep data available for these program code instructions in the old data area. If all program code instructions of this kind are modified, insofar as the new software module is concerned, the control program henceforth comprises only program code instructions that relate to the new data area. As soon as this is ensured, the old data area and the program code instructions for converting data from the old to the new data area can be removed. Parts of the control program that have become unnecessary can therefore be deleted and only the memory area actually required is occupied.

In accordance with the preferred embodiment, the new software module is assigned a reference that previously designated the old software module. Suitable as a reference in this context is a name such as "function block 10" or "FB 10". When the new software module is first loaded, it is assigned a temporary name or a temporary reference so that it can be loaded simultaneously with the old software module. If a reference which previously designated the old software module is subsequently assigned to the new software module, it is ensured that the entity which had originally provided the old software module, i.e., for example, a programming device with an engineering system, recognizes the new software module (under the reference of the old software module) again as "its" module. The reference previously designating the old software module can be assigned to the new software module by newly loading the new software module under the reference of the old software module and replacing the old software module in the process. Renaming the new software module after it has been loaded for the first time is also a possibility. The renaming then causes the reference which previously designated the old software module to be used as a reference for the new software module.

It is also preferably provided that the program code instructions initially replaced in the runtime group module are re-removed and a program code instruction for invoking the new software module under the former reference of the old software module is inserted in their place in the runtime group module. After such a change, the data in the runtime group module is essentially once more in a state such as that which existed prior to the change caused by insertion of the new software module. The runtime group module no longer contains any program code instructions for invoking the generated copy routine and the runtime group module now includes only a program code instruction for invoking the new software module, and moreover under the reference under which the old software module was previously invoked at the same point.

In an advantageous embodiment, the memory areas occupied by the old software module and/or by the old data area in the memory of the automation system are re-released. This ensures optimal utilization of the memory space available in the automation system and the old software module, which is no longer invoked anyway, and the old data area correlated therewith no longer tie up resources of the automation system unnecessarily.

In an embodiment of the method, found program code instructions which relate to the old data area and which cannot automatically be changed into program code instructions relating to the new data area are copied into a task list. The task list is available for manual processing by an operator, and moreover preferably for processing in the engineering system. The aim of this manual processing is to supplement the automatically generated copy routine for converting data from the old memory area into the new memory area for each entry contained in the task list, such that after the task list has been processed completely a partly automatically generated and a partly manually supplemented copy routine for converting data from the old data area into the new data area and vice versa are available. The purpose of the task list is therefore to reveal accesses (interconnections) which cannot be converted automatically, e.g., accesses involving incompatible types. An example of such an incompatibility is a program code instruction which wants to read a data item of type "long word" from the data area when, as a result of the modification of the software module, only memory for a data item of type "word" is provided for the data in the data area.

In this case, it is particularly preferably that in the event of any program code instructions which relate to the old data area and which cannot automatically be changed into program code instructions relating to the new data area, the substitution of the call for invoking the new program module in place of the old software module in the runtime group module is deferred or prevented until such time as the task list resulting from such program code instructions has been emptied. It is achieved in this way that it will only be possible to invoke the new software module when its provision and disposal is fully ensured through corresponding copying over from the old data area into the new data area and vice versa, with the result that the functional integrity of the control program as a whole is guaranteed.

In a method for operating an automation system, as described here and in the following, when a plurality of new software modules are substituted for a corresponding plurality of old software modules a new software module from the plurality of the new software modules is preferably substituted in succession for each corresponding old software module and a replacement sequence within the plurality of new software modules is chosen in accordance with a respective call hierarchy for invocation of the respective old or new software module. This takes into account, on the one hand, that it is not possible to replace an arbitrarily large number of software modules simultaneously. On the other hand, the replacement process in accordance with the call hierarchy occurs according to a clear structure which, e.g., also simplifies the manual processing of a task list, because all the entries present in the task list relate to one and the same software module.

The invention also relates to an automation system operating in accordance with the method of the invention, i.e., an automation system having a memory and a processing unit for executing a control program which can be loaded into the memory, wherein to execute the method, as described here and in the following, means are provided for its implementation, i.e., for substituting a new software module for an old software module previously incorporated in the control program, and moreover at the runtime of the control program. The invention also relates to a computer program comprising computer-executable program code instructions for implementing the method and its embodiments when the computer program is executed on a computer, i.e., by the automation system or an automation device incorporated therein or alternatively an engineering system connected at least temporarily to the automation system. The invention also relates to a computer-readable storage medium having such a computer program which is executable by a computer, i.e., a computer program that comprises program code instructions and by which the method in accordance with the invention and/or individual embodiments thereof is and/or are implemented.

The functionality of a software module is determined by program code instructions provided therefor. If a software module is used at least once in a control program, the program code instructions become part of the control program precisely once. A software module is invoked together with its data area, the instance (DB). If a software module is used more than once, a separate data area is created for each such use, while the program code instructions of the software module continue as before to be part of the control program only once.

A situation in which the functionality of a P controller (proportional controller) is implemented by a software module may serve as an example. Such a functionality can be used multiple times in a control program, e.g., with different proportionality factors and/or for different control operations. For example, if in the course of a batch process the fill level of a plurality of reactors is to be monitored by a proportional controller for reaching a set point fill level, the same functionality can be used for each such reactor fill level control function. Here, different parameters are held in readiness in different instance (DBs). The calls to invoke the reactor fill level control function are then executed with the respective instance (DB). If the functionality of such a controller module changes such that this has repercussions for the interface, i.e. the data area (i.e., instance (DB)), or if only the interface is changed, all uses (i.e., occurrences) of the controller module must be changed in the control program. For this purpose, the new functionality (i.e., program code instructions) has to be incorporated into the control program only once, even if the controller module is used multiple times. Initially the old functionality is still included in the control program. The new functionality is invoked with a corresponding new data area, in which case a previous, old data area is likewise retained initially. Because of the replacement at runtime, the control program may (or will) initially still include interconnections relating to the old data area. This is why a copy routine is provided for transferring the data from the old data area or a plurality of old data areas into the respective new data area and vice versa.

New data areas and copy routines are created sequentially, or group by group in the control program for each independent use of the controller module. Thereafter, if the original functionality of the controller module is no longer invoked, the corresponding program code instructions can be removed from the control program. If all interconnections that were related to old data areas have been replaced by corresponding interconnections relating to new data areas, the old data areas and the copy routines are also no longer required. With this concept, it is of no importance whether the control program is a single program or possibly a group of programs which possibly even run on distributed devices, i.e., one or more automation devices and/or one or more control and monitoring systems. The replacement occurs under control of an engineering system, as normally used at least for creating a control program. The engineering system can load the control program or parts thereof onto the corresponding devices. When the invention is implemented, the engineering system or a corresponding functionality loads the program code instructions of the controller module assumed as modified by way of example onto each device affected by the change. New data areas are then provided on each device affected and calls for invocation of the new controller module are scheduled with the new data areas and the copy routine. The functionality of the copy routine is likewise determined by the engineering system, possibly with an operator manually supplementing an automatically generated part of the copy routine on the engineering system. Following completion of the replacement of the controller module, the engineering system also handles the removal of parts that are no longer required from the control program.

Each exemplary embodiment is not to be understood as a restriction of the invention. Rather, numerous variations and modifications are possible within the scope of the present disclosure, in particular such variants and combinations which may be derived by the person skilled in the art with regard to the achievement of the object e.g. by combination or modification of individual features or elements or method steps described in connection with those described in the general or specific part of the description as well as contained in the claims and/or the drawing and which lead by means of combinable features to a new subject matter or to new method steps or method step sequences.

BRIEF DESCRIPTION OF THE DRAWINGS

An exemplary embodiment of the invention is explained in more detail below with reference to the drawing, in which objects or elements corresponding to one another are labeled with the same reference signs in all the Figures and, in which.

DETAILED DESCRIPTION OF THE PRESENTLY PREFERRED EMBODIMENTS

Figure 1:
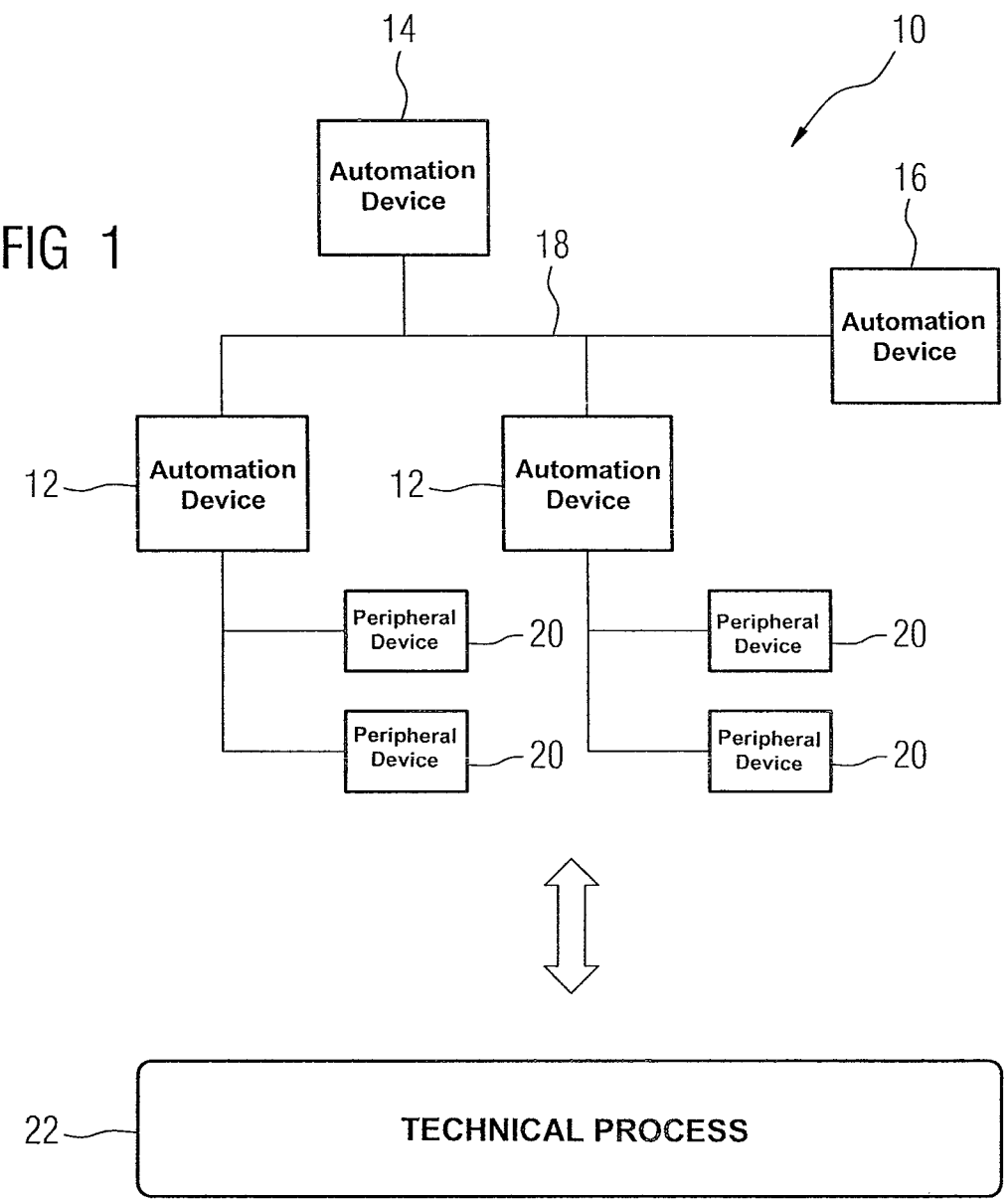
FIG. 1 is an illustration of an automation system having at least one automation device in accordance with the invention.

FIG. 1 shows an exemplary embodiment of an automation system 10, which comprises at least one automation device 12, a plurality of automation devices 12, 14, 16. In this embodiment, the automation device 14 is a control station or engineering system 14 and the automation device 16 an operator control and monitoring device 16. The automation devices 12, 14, 16 are communicatively connected to one another, e.g., over a bus 18. Overall, they are intended together with any decentralized peripheral devices 20 for controlling and/or monitoring a technical process 22 (not shown in greater detail), possibly without a temporarily connected control station serving as an engineering system.

Figure 2:
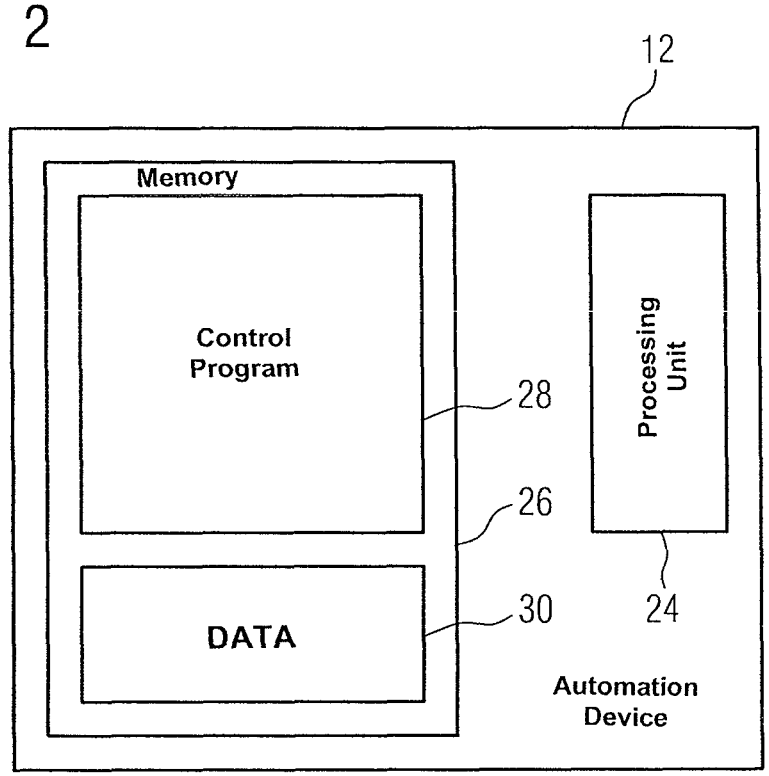
FIG. 2 in an illustration of an automation device with further details, such as a memory incorporated therein and a control program held resident in the memory.

FIG. 2 shows in schematically simplified form, taking one of the automation devices 12, 14, 16 from FIG. 1 as an example, that each device includes a processing unit 24 comprising a processor or the like and a memory 26. A control program 28, which specifies how the respective automation device 12, 14, 16 is to interact with the technical process 22, can be loaded into the memory 26. Thus, for example, values measured by sensors (not shown) arranged in the technical process 22 are read out under control of the control program 28 or actuators (not shown), provided they are energized to influence the technical process 22. The control program 28 processes data 30 likewise stored in the memory 26. The program stored in a memory of an automation device 12, 14, 16 or the totality of all such programs can each be regarded as the control program 28, where the control program accordingly is normally also a control and monitoring program in an automation device 16 serving as an operator control and monitoring device.

Figure 3:
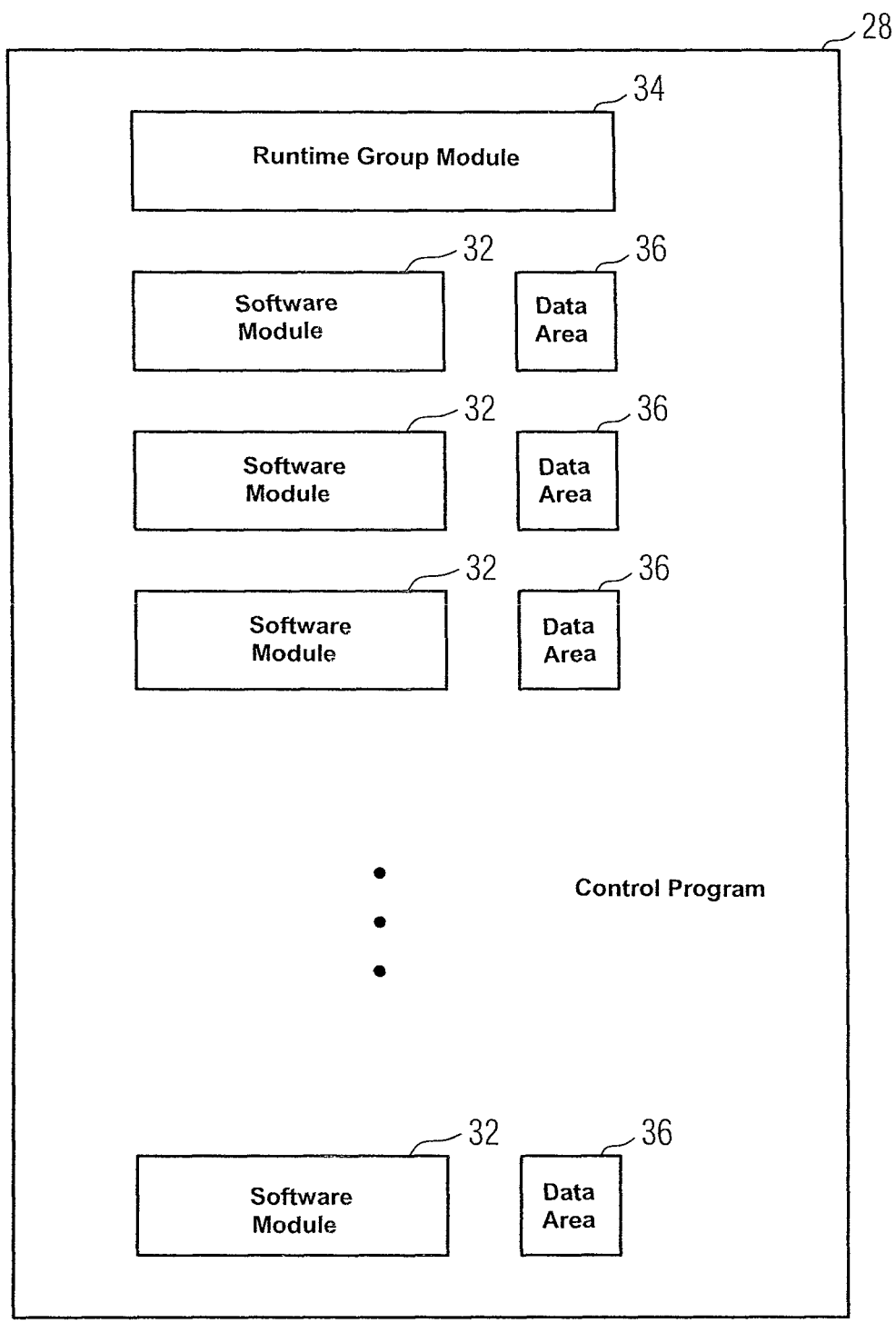
FIG. 3 is an illustration of a control program having a number of software modules incorporated therein and a runtime group module for their invocation.

FIG. 3 shows the basic structure of a control program 28 in schematically simplified form. The control program 28 comprises a plurality of software modules 32, each containing program code instructions (not shown) in a manner known per se. Each software module 32 is normally provided for implementing a specific functionality of the control program 28. By way of example, a first software module 32 comes into consideration for the purpose of acquiring analog measured values in the technical process 22, e.g., route data. Proceeding from this basis, an instance of a software module which implements a control algorithm (control module) could be provided as a second software module 32. The second software module 32 can then be used for controlling a movement operation based on the acquired route data. Further instances of the same control module can be provided at another point in the control program 28. Such further instances do not differ in terms of their functionality from the second software module 32 cited above by way of example, but are different only in respect of the data processed in each further instance of the software module, with the result that functions, such as temperature, fill level speed control functions, can be implemented.

The software modules 32 are invoked by a runtime group module 34 likewise incorporated in the control program 28, and moreover are called in a predefinable sequence. For simplicity, only one runtime group module 34 is shown. In actual fact each control program 28 can comprise a multiplicity of runtime group modules 34.

The control program 28, together with its software modules 32, is executed by the processor 24, moreover specifically in that the runtime group module 34 or, in a more complex embodiment, a plurality of runtime group modules 34 is or are each executed in a predefined timeframe. The implementation of the runtime group module 34 specifies a hierarchy of the software modules 32 and an order in which these software modules are executed in turn in accordance with the call sequence configured there. This results in a quasi-cyclical execution also for their execution.

Each software module 32 is assigned one or more data areas 36 that each act as an interface for the respective software module 32 (e.g., in order to be able to transmit data for controlling a movement operation to a first instance of a controller module and data for regulating temperature to a further instance of the same controller module). For that purpose, data is stored in the data area 36 by the control program 28 or other software modules 32, the data having to be processed as input data by the respective software module 32. During its execution, the respective software module 32 stores in the data area 36 such data that is to be made available to the control program 28 as a whole or to other software modules 32 as output data of the respective software module 32.

Figure 4:
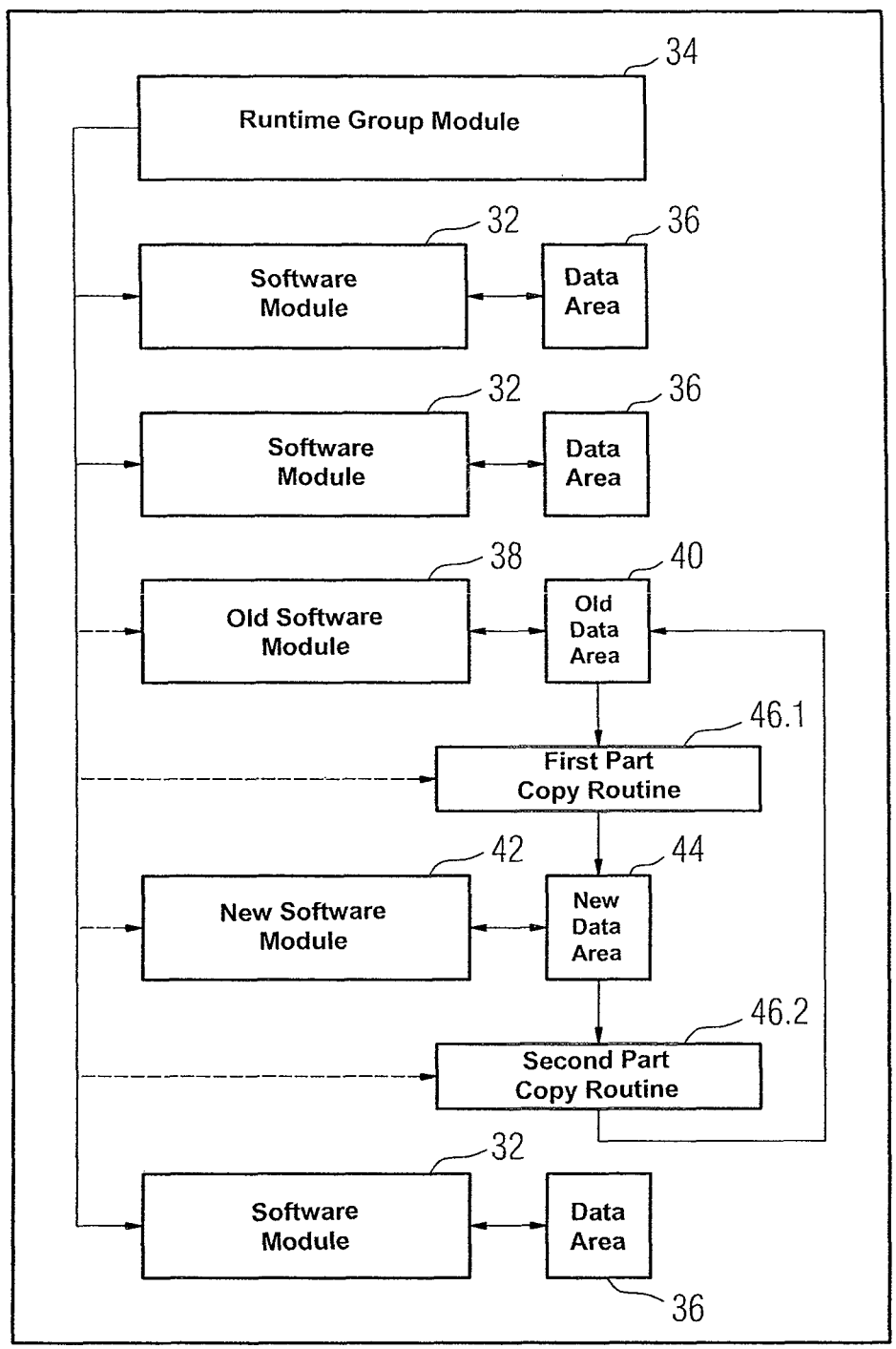
FIG. 4 is an illustration of the control program with an old software module that is to be replaced and a new software module provided as its replacement.

FIG. 4 generally shows the control program 28 as already depicted in FIG. 3. Additional details are inserted for the purpose of explaining the method in accordance with the invention.

Merely for purposes of visual differentiation, FIG. 4 shows one of the software modules 32 in a position shifted slightly to the right (shown with dashed lines). For the software module, it is to be assumed for the further course of the description that it is to be replaced in the control program 28. Accordingly, the software module is referred to in the following as the old software module 38 and the associated data area as the old data area 40. Similarly, a further software module is shown in a position shifted slightly to the left (shown with dashed lines), likewise simply for the purpose of visual differentiation. For the remainder of the description this software module is to represent a new software module 42 and the associated data area a new data area 44. The new software module 42 is added to the control program 28 at the runtime of the latter and is intended to replace the old software module 38. Toward that end the invention provides the approach described hereinbelow.

The new software module 42 is loaded into the memory 26 (FIG. 2) of the respective automation device 12, i.e., into a memory 26 included in the automation system 10. Before or after this, the old data area 40 associated with the old software module 38 is compared with the new data area 44 associated with the new software module 42, the comparison relating, not to the contents of the data areas 40, 44, but to their structure, which is to say the number and in each case type of the data which can be stored there. This is preferably performed offline based on the original data of the control program 28 still kept available in the engineering system. Based on the structure comparison (hereinafter, comparison) a copy routine 46 (shown here as a first and second part 46.1, 46.2 included therein) is generated with program code instructions for converting data for the or from the old data area 40 into data for the or from the new data area 44. Preferably, the copy routine 46 or its parts 46.1, 46.2 is or are also generated in the engineering system. The copy routine 46 is then likewise transferred to the automation device 12 in connection with the loading of the new software module 42 into the memory 26 of the automation device 12. The copy routine 46 comprises a first and a second part 46.1, 46.2; the first part 46.1 is invoked before and the second part 46.2 is invoked after execution of the new software module 42. The first part 46.1 of the copy routine 46 can be subdivided again into a section invoked once and a part invoked cyclically (not shown). The section of the first part 46.1 of the copy routine 46 invoked once or a single time copies a logical copy, i.e., a copy of the contents of the old data area 40 (of the instance (DB) of the old software module 38) oriented toward the data stored there and its structure into the new data area 44 (the instance (DB) of the new software module 42). The cyclical section of the first part 46.1 of the copy routine 46, i.e., the section accordingly repeatedly invoked until the old software module 38 is replaced, transfers a logical copy of the data generated or modified by software modules of the control program that are not affected by the replacement from the old data area 40 into the new data area 44. The section invoked once (or invoked a single time) and the cyclically invoked section of the first part 46.1 of the copy routine 46 can also be combined. The first part 46.1 of the copy routine 46 then comprises only a cyclically executed section that logically copies the data stored in the old data area 40 into the new data area 44. The second part 46.2 of the copy routine 46 comprises a cyclical section and accordingly is invoked repeatedly until the old software module 38 has been replaced. The copy routine 46 transfers a logical copy of the data generated or modified by the new software module 42 in its new data area 44 into the old data area 40 so that the data processed by the new software module 42 will also be available to the software modules of the control program that are not affected by the replacement.

The data acquired in this way from the cyclically executed section of the first part 46.1 of the copy routine 46 is data resulting due to input interconnections, i.e., the data is made available as input data to the old/new software module 38, 42, of other software modules. Here, other software modules coming into consideration are likewise software modules belonging to the control program executed on the local automation device as well as such software modules belonging to a control program executed on a remote automation device (e.g., an operator control and monitoring device). Accordingly, the data acquired by the second part 46.2 of the copy routine 46 is data resulting because of output interconnections, i.e., the data is made available as output data by the new software module 42, of other software modules.

As a result of the generation of the program code instructions for converting data for the or from the old data area into data for the or from the new data area, it is thus ensured that the control program can continue to run with those of its software modules that are not affected by the replacement. It is possible that these software modules access the old data area of the old data module that is to be replaced. To ensure this data is also accessible to the new software module, the data is copied over from the old data area into the new data area.

As soon as the copy routine 46 is available, a program code instruction for invoking the old software module 38 together with the associated instance (DB), the old data area 40, is replaced in the runtime group module 34 with a program code instruction for invoking the generated program code instructions for data conversion, i.e., the copy routine 46, and for invoking the new software module 42 with its instance (DB), the new data area 44. The invocation of the software modules 32 together with the respective instance (DB) (data area 36) by the runtime group module 34 is represented here by arrows originating from the runtime group module 34 and ending at the software module 32 that is to be invoked in each case. A corresponding invocation of the old or new software module 38, 42 or of the copy routine 46 is indicated by dashed arrows because, e.g., the call for invoking the old software module 38 is not permanent and is dispensed with after the new software module 42 has been incorporated into the calls executed by the runtime group module 34.

The call for invoking the new software module 42 is not permanent because there is no provision for its invocation as long as the old software module 38 continues to be invoked by the runtime group module 34. Similarly, the call for invoking the copy routine 46 is also not permanent because the copy routine 46 will not be invoked while the old software module 38 continues to be called. Once the new software module 42 has completely replaced the old software module 38 and any usage of data in the previous old data area 40 has been converted into a usage of the data in the new data area 44, there is no longer any provision for a further use of the copy routine 46 and accordingly for its invocation.

Figure 5:
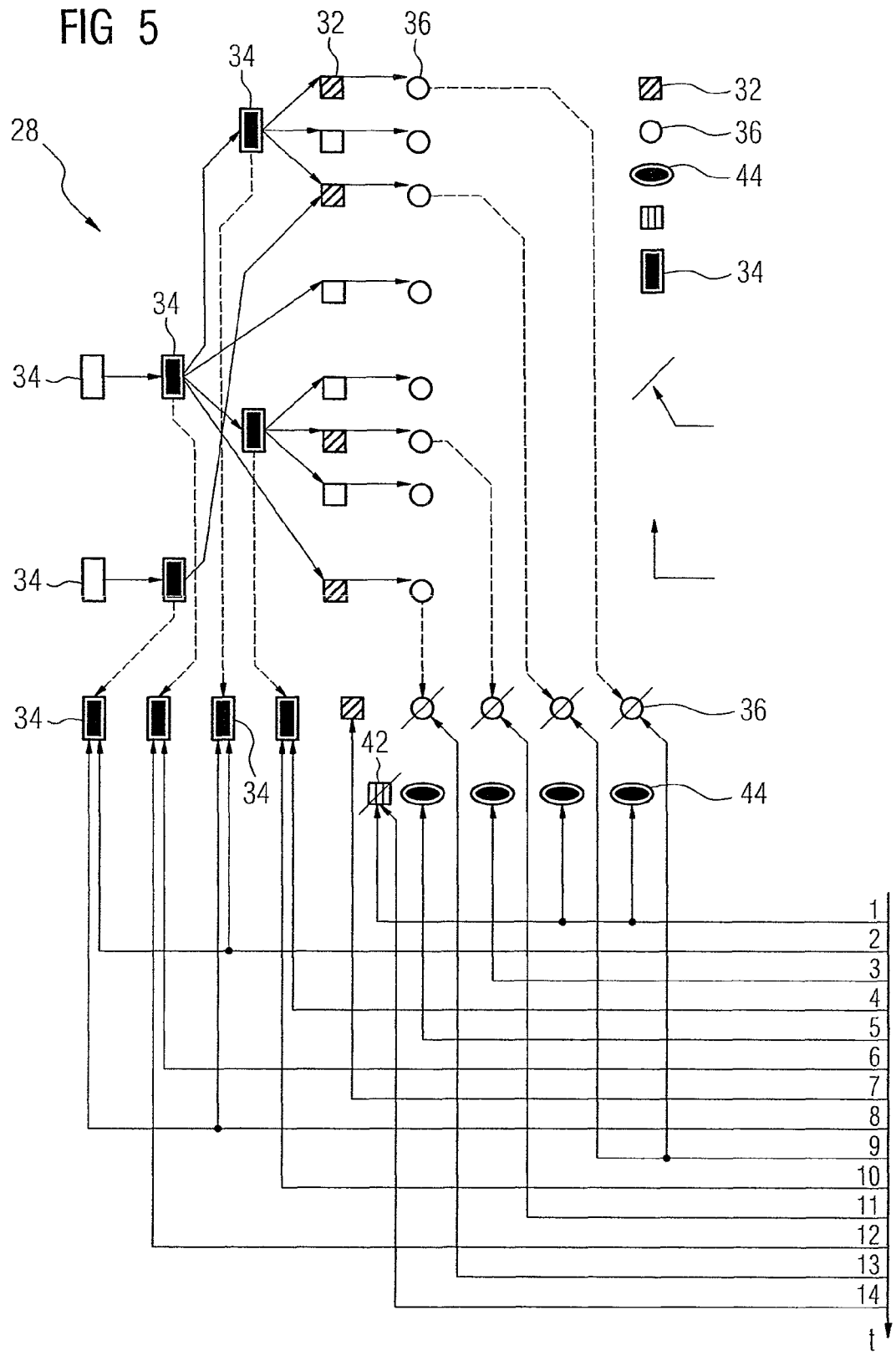
FIG. 5 is a graphical illustration of an execution sequence when a new software module is substituted for an old software module that is to be replaced.

FIG. 5 shows the replacement of an old software module 38 by a new software module 42 in greater detail. A key with the symbols used is shown top right in the diagram. To avoid an unnecessarily confused illustration, the reference numerals entered there are not repeated every time for the respective symbols in the rest of the diagram. A first key symbol with an incoming vertical arrow illustrates the representation of the creation of a data structure, e.g., a software module or a data area. A further key symbol with an incoming diagonal arrow illustrates the representation of the deletion of a data structure, and moreover is supplemented by addition of a diagonal stroke which appears as a strikethrough on the symbol representing the respective data structure.

A control program 28 (see also FIG. 4) with the calls configured therein having a hierarchical structure is shown at the top left of the diagram. The control program 28 comprises a plurality of software modules 32 and runtime group modules 34. Each software module 32 is assigned a data area 36. The operations taking place during the replacement of a software module 32 by a new software module 42 are shown by way of example by a time axis t in the lower part of the diagram.

It is important to note that due to the representation of the configured calls, a multiple representation of the same software module 32 does not imply the multiple presence of the software module 32 in the control program 28. The program code incorporated in the software module 32 is only a part of the control program 28; one and the same software module 32, e.g., the software module 32 identified by hatching, appears multiple times in the diagram shown in FIG. 5 only because it is invoked multiple times. The conditions in the memory 26 of the automation device 12 are illustrated in part in the top part of the lower section of the diagram in FIG. 5. Shown there are the old and new data areas 36, 44, a number of runtime group modules 34, and a new software module 42.

The new software module 42 is created as a temporary software module at time instant t=1. This new software module 42 is provided as a replacement for those software modules 32 (i.e., old software module 38) identified by corresponding hatching in the top part of the diagram. The software module 32 that is to be replaced (i.e, old software module 38) is used multiple times in the control program 28. A simultaneous replacement of all call points for invocation of the software module 32 that is to be replaced and of the associated instance (DBs) is not possible due to the multiplicity of call points in different runtime groups and the multiplicity of the associated data areas in each case. Consequently, the replacement is performed one step at a time. For this, it is considered how and where the software module 32 that is to be replaced (i.e., old software module 38) is invoked together with its instance (DBs) (i.e., the old data areas 40). For that purpose, reference is made in the following to the runtime group modules 34 (represented as solid) in accordance with their vertical sequence in the diagram as first, second, third and fourth runtime group module 34. The runtime group modules 34 represented as solid designate such modules that subsequently undergo a modification, as will be described further below.

Two software modules 32 that are to be replaced (i.e., old software modules 38) are invoked by the first runtime group module 34. Accordingly, two new data areas 44 are created, likewise at time instant t=1. As a result, the modified program code, i.e., the new software module 42, and instance (DBs) with which this can work in each case, i.e., initially two new data areas 44, are available on the side of the automation device 12 which executes the control program 28. The new software module 42 is therefore loaded into the memory 26 of the automation system 10 or of an automation device 12 incorporated therein.

The first runtime group module 34 is replaced or modified at time instant t=2. The change in the runtime group module 34, or a corresponding change in a new runtime group module 34 which replaces the first runtime group module 34, relates at least to a modification of that program code instruction (not shown) which encodes the call for invocation of the software module 32 that is to be replaced in the runtime group module 34. Each such program code instruction is replaced by a program code instruction for invoking the new software module 42 together with its instance (DB), the new data area 44. In addition, prior to and after the invocation, calls for invoking the copy routine 46 (not shown in FIG. 5; see FIG. 4) are inserted into the runtime group module 34. With the modification of the first runtime group module 34, the new software module 42 is used with immediate effect in the control program. The fourth runtime group module 34 must also be modified, as described above, likewise at time instant t=2, to avoid inconsistencies, because the fourth runtime group module 34 invokes the new software module 42 with the same instance (DB) as the first runtime group module 34.

The time instants t=1, t=2, etc., used here and in the following to provide a structured illustration of the execution sequences, are time instants or time segments at or during which the described exemplary actions occur. So-called cycle control points are especially suitable for such time instants. In programmable logic controllers, cycle control points are special states during the cyclical processing of the respective control program, e.g., cycle start or cycle end. Here, the exact time instants are not necessarily fixed. Rather, the order of the individual actions is of significance. Here, it must additionally be taken into account that the time instants t=1, t=2, etc. indicated in FIG. 5 are not necessarily equidistant. It is also not necessary for individual actions out of those described to be executed at every cycle control point. The time instants t=1, t=2, etc. therefore describe nothing other than a temporal sequence. Additional time instants usable for individual actions of the method can occur between two adjacent time instants, e.g., t=1 and t=2. Thus, when reference is made here and in the following to a synchronism, such a synchronism relates only to the time instants and time segments shown in FIG. 5 and chosen for the purposes of a simplified description. Apart from the above explanation, a more finely granular time division underlying the as depicted time division remains out of consideration for the further description.

A further new data area 44 is created at time instant t=3, moreover specifically for that new software module 42 which is invoked by the third runtime group module 34. Thereafter, at time instant t=4, the third runtime group module 34 can be replaced or modified, as described above. As a result, the new software module 42 will be invoked at that point too, together with the further new data area 44 created in time instant t=3 used thereby.

Yet a further new data area 44 is created at time instant t=5, moreover specifically for that new software module 42 which is invoked by the second runtime group module 34. Thereafter, at time instant t=6, the second runtime group module 34 can be replaced or modified so that the new software module 42 will be invoked there too.

After time instant t=6 and before time instant t=8, all modifications are stored in the memory of the respective automation device, e.g., of the first automation device 12. From now on, all references, i.e., input or output interconnections to other software modules, can be relocated from the respective old data area 40 to the new data area 44 so that subsequently the copy routines can be re-removed. The relocating of external interconnections, i.e., interconnections from or to software modules of a control program of a different automation device, is not shown here, but can be performed in an optimized manner if necessary with the modification of the runtime group module 34. After time instant t=6 other automation devices, e.g. the operator control and monitoring device 16, must also be reloaded, since addresses changed in the following steps become invalid.

At time instant t=7 the new software module 42 is assigned a reference which previously designated the replaced, old software module, or the new software module 42 as shown is newly loaded under the reference of the replaced, old software module and is therefore (initially) identically present in duplicate.

At time instant t=8 the modifications made in time instant t=2 to the first and fourth runtime group module 34 are all but reversed such that these are modified such that the newly loaded, new software module 42 is now again invoked under the original reference. In addition, the previous call for invocation of the copy routine 46 is also re-omitted, because references to the old data area 40 no longer exist. In time instant t=9, the old data areas 36 used by the two instances of the replaced, old software module invoked from the first runtime group module 34 are deleted. The same deletion occurs at time instants t=10 and t=11, as well as t=12 and t=13 for the third and second runtime group module 34, respectively, and the old data areas 36 used in connection with invocations there. The (temporary) new software module 42 created at time instant t=1 is deleted at time instant t=14 because it is no longer referenced.

The execution sequences illustrated in FIG. 5 are based on the assumption that the modified control program is present in an engineering system with at least one new software module 42 in the modified form resulting thereafter. The control program can be modified in the engineering system offline, without affecting the runtime behavior of the (previous) control program 28 in the automation device 12. The modified parts of the control program in the engineering system are accordingly transferred successively, as described above, to the automation device 12. Following completion of the transfer process, the control program 28 executed by the automation device 12 corresponds to the modified control program in the engineering system. During the transfer of the modified program parts and during the incorporation of the program parts into the control program 28, the execution of the control program 28 is not interrupted by the automation device 12. The replacement therefore occurs in its entirety at runtime. A technical process controlled or monitored by the control program 28 can therefore likewise be continued without interruption. In certain situations a barely noticeable lengthening of the cycle control points may be expected; the cycle load may also increase slightly due to the copy routines. However, the continued executability of the control program 28 is called into question thereby just as little as the continued control and/or monitoring of the respective technical process.

Figure 6:
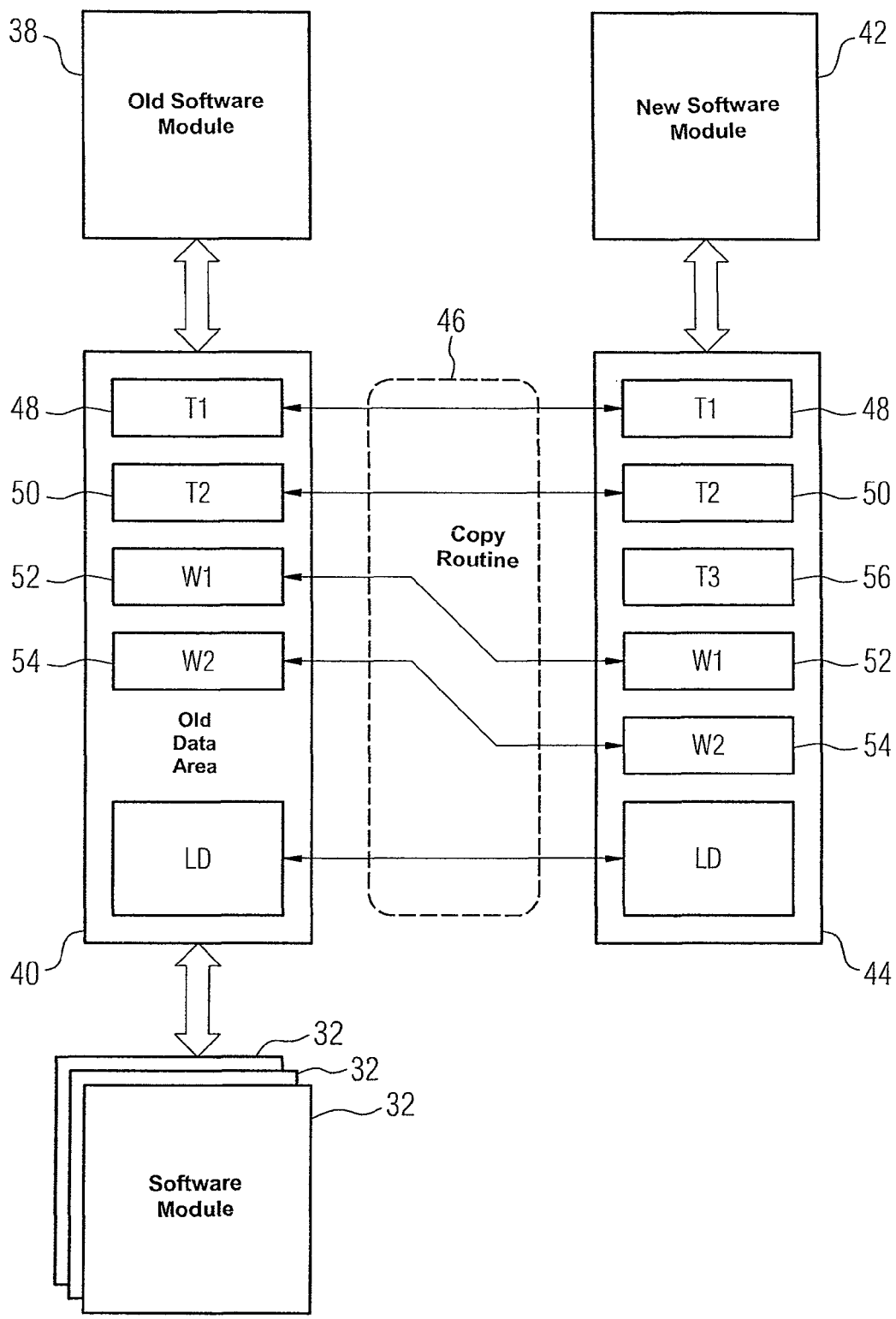
FIG. 6 is a graphical illustration of copy operations between an old data area associated with the old software module and a corresponding new data area assigned to the new software module.

FIG. 6 is a graphical illustration of the method in accordance with the invention, where program code instructions for converting data for or from the old data area 38 (see FIG. 4) into data for or from the new data area 44 is generated and subsequently used in the execution of the control program 28 (see FIG. 4). For this purpose, it is assumed that an old software module 38 that is to be replaced in the control program 28 is used at least once, so that the control program 28 includes at least one instance (DB), the old data area 40, for the software module 38 that is to be replaced. By way of example, it is also assumed for the old data area 40 that a first and second item of temperature data (T1, T2) 48, 50 and a first and second item of route data (W1, W2) 52, 54 are used there. For the new software module 42, in contrast, it is assumed that its use and its integration into the control program 28 are necessary because a third temperature data item (T3) 56 is to be processed by the control program 28. Even with reference to the schematically simplified representation in FIG. 6 it is evident that the use of the new data area 44 instead of the old data area 40 is not possible simply as a matter of course. To be specific, an access to a third storage location in the old data area 40 delivers the first route data item (W1) 52, while an access to a corresponding storage location in the new memory area 44 yields the third temperature data item (T3) 56. As a result, it is therefore provided in accordance with the invention that program code instructions are generated for converting the data from the old data area 40 to the new data area 44 and program code instructions are generated for converting the data from the old data area 44 to the new data area 40. This conversion is indicated in the diagram in FIG. 6 by the double arrows running between the respective data items 48, 50, 52, 54 and has also been referred to elsewhere as logical copying. With the copying of all data items 48, 50, 52, 54 from the old data area 40 into the new data area 44, the new software module 42 can function with all the data processed by the control program 28 and the software modules 32 incorporated therein. Conversely, the control program 28 with its software modules 32 can also work with all data items 48, 50, 52, 54 already known within the scope of the old data area 40, because the data is copied from the new data area 44 into the old data area 40 and is available there for access by the control program 28 and its software modules 32. Also acquired in the copy operation is local data (LD) of the respective software module, which data is likewise stored in its data area (i.e., instance (DB)); even modifying just this local data (LD) without changes to the interface of the software module would necessitate cross-copying of data.

If the new software module 42 is used multiple times in the control program 28, the software module 42 is invoked with a separate new data area 44 due to each use. Multiple uses of the new software module 42 accordingly also result in a plurality of new data areas 44 and a plurality of copy routines 46 for converting the data from the respective old data area 40 into the respective new data area 44.

The or each copy routine 46 allows the use of the new software module 42 in an otherwise unchanged control program 28. However, in order to completely replace the old software module 38 with the new software module 42, the old software module 38 and the associated old data area 40 are removed from the control program 28. Any accesses from the control program 28 to the old data area 40 are then no longer possible. Accordingly, the control program 28 must be searched for program code instructions relating to the old data area 40, and program code instructions found in the process must be modified so that they relate to the new data area 44.

Preferably, the control program 28 is searched using the copy thereof held in the engineering system, which copy is the basis for the control program 28 in the memory 26 of the automation device 12, and at time instants t=6 and t=7 in accordance with the diagram shown in FIG. 5. Affected software modules 32 found in the search can be replaced in the automation device 12 in a similar manner to that described with reference to FIG. 5. However, in certain cases it is also sufficient to reload the affected software module 32 at a cycle control point, because changing an address of a variable used normally has no impact on the rest of the control program 28. Replacing the affected program code in a loaded software module at a cycle control point ("patching") possibly also comes into consideration.

Figure 7:
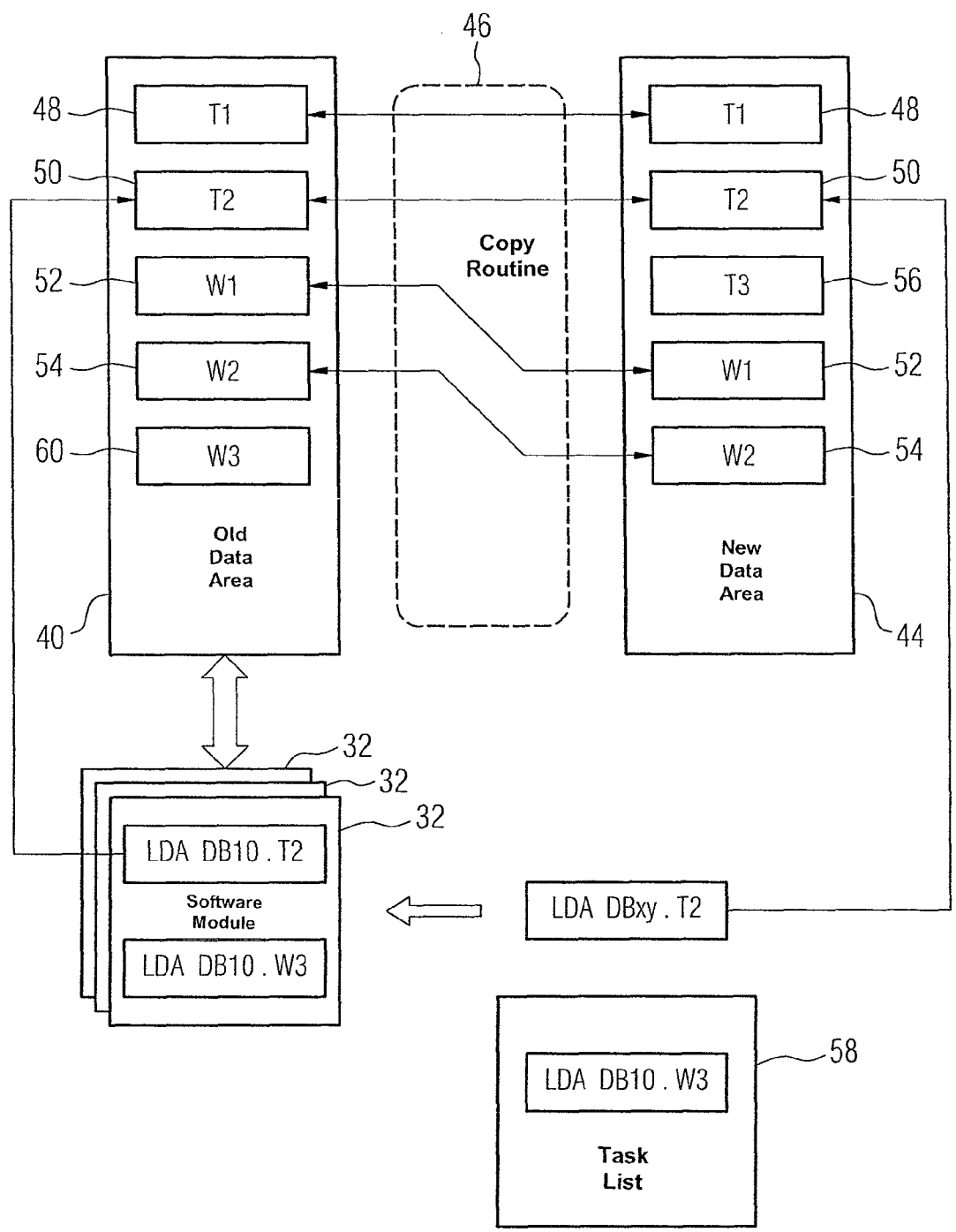
FIG. 7 is a graphical illustration of changes of program code instructions of the control program that relate to the old data area into corresponding program code instructions relating to the new data area.

Searching and subsequent modification is also referred to as "mapping". In that regard FIG. 7 shows by way of example a software module 32 containing a program code instruction whose argument refers to the old data area 40. There, the old data area 40 is designated symbolically in the argument shown by way of example, in this case as "DB10" for "data block 10". The data item referenced in the old data area 40 is likewise represented symbolically, in this case as "T2". The symbolic identifiers "DB10" and "T2" have a numeric equivalence, such that the storage location filled with the second temperature data item 50 is referenced in the memory area occupied by the old data area 40. The numeric equivalence of an identifier such as "DB10" can be considered as the start address of the old data area 40 in the memory 26. The numeric equivalence of an identifier such as "T2" is then a relative address in relation to the start address defined by "DB10". The address of the referenced data item can be obtained by adding the two addresses. Changing the found program code instructions relating to the old data area 40 into such program code instructions that relate to the new data area 44 therefore necessitates the replacement of the address to which the respective argument of the program code instruction refers. In a program code instruction containing "DB10.T2" as argument, it is sufficient to insert the symbolic identifier of the new data area 44 (represented as "DBxx.T2" in FIG. 7, with DBxy as the symbolic identifier for the instance DB, the new data area 44, the new software module 42) for the symbolic identifier "DB10" of the old data area 40. In the case of a symbolic identifier "DB10.W2", it must be taken into account, based on the conditions assumed in FIG. 4, that the position of the second route data item "W2" 54 changes in the new data area 44 compared to the position of the same data item in the old data area 40. Accordingly, in the case of a program code instruction having such an attribute, it is also necessary to change the relative address of the respective data item.

When the control program 28 is searched, if program code instructions are found that relate to the old data area 40 and cannot automatically be changed into program code instructions relating to the new data area 44, provision is made for their transfer into a task list 58. This situation is shown in FIG. 7 using the example of a program code instruction with the symbolic argument "DB10.W3". The data item W3 designates a third route data item 60 in the old data area 40. No third route data item is provided in the new data area 44, however. Accordingly, an automatic conversion is not possible. The program code instruction in question is copied into the task list 58, where it is available for manual processing and modification. A manual change can mean, e.g., that only the low-order part of the second route data item (W2) 54 will be addressed as the third route data item 60 in the new data area 44.

Once all program code instructions that relate to the old data area 40 have been replaced either automatically or manually in the control program 28 by corresponding program code instructions relating to the new data area 44, the copy routine 46 is dispensable and the new software module 42 with its new data area 44 completely replaces the old software module 38 with its old data area 40, and the old modules 38, 40 can be deleted.

Additional complexity results for the application of the method in accordance with the contemplated embodiments of the invention when a plurality of devices, e.g., at least one operator control and monitoring device 16 (FIG. 1) in addition to an automation device 12, need to access the data processed by the control program 28. In that case "mapping", as described above with reference to FIG. 7, is also required for each control program or control and monitoring program executed there.

The invention can therefore be briefly summarized as a method for operating an automation system 10 which executes, as an automation solution, a control program 28 having a plurality of software modules 32, where the method comprises the following steps for replacing at least one software module comprising an old software module 38 at the runtime of the control program 28 with a new software module 42, wherein an old data area 40 associated with the old software module 38 is compared with a new data area 44 associated with the new software module 42, program code instructions are generated for converting data for or from the old data area 40 into data for or from the new data area 44, the new software module 42 and the new data area 44 are loaded into a memory 26 of the automation system 10, and a program code instruction for invoking the old software module 38 is replaced with program code instructions for invoking the generated program code instructions for data conversion and for invoking the new software module 42. The contemplated embodiments of the method in accordance with the invention ensures the consistency of the data not only within the automation device 10 executing the control program 28, but also in relation to remote automation devices, e.g., an operator control and monitoring device 16, at all times.

Figure 8:
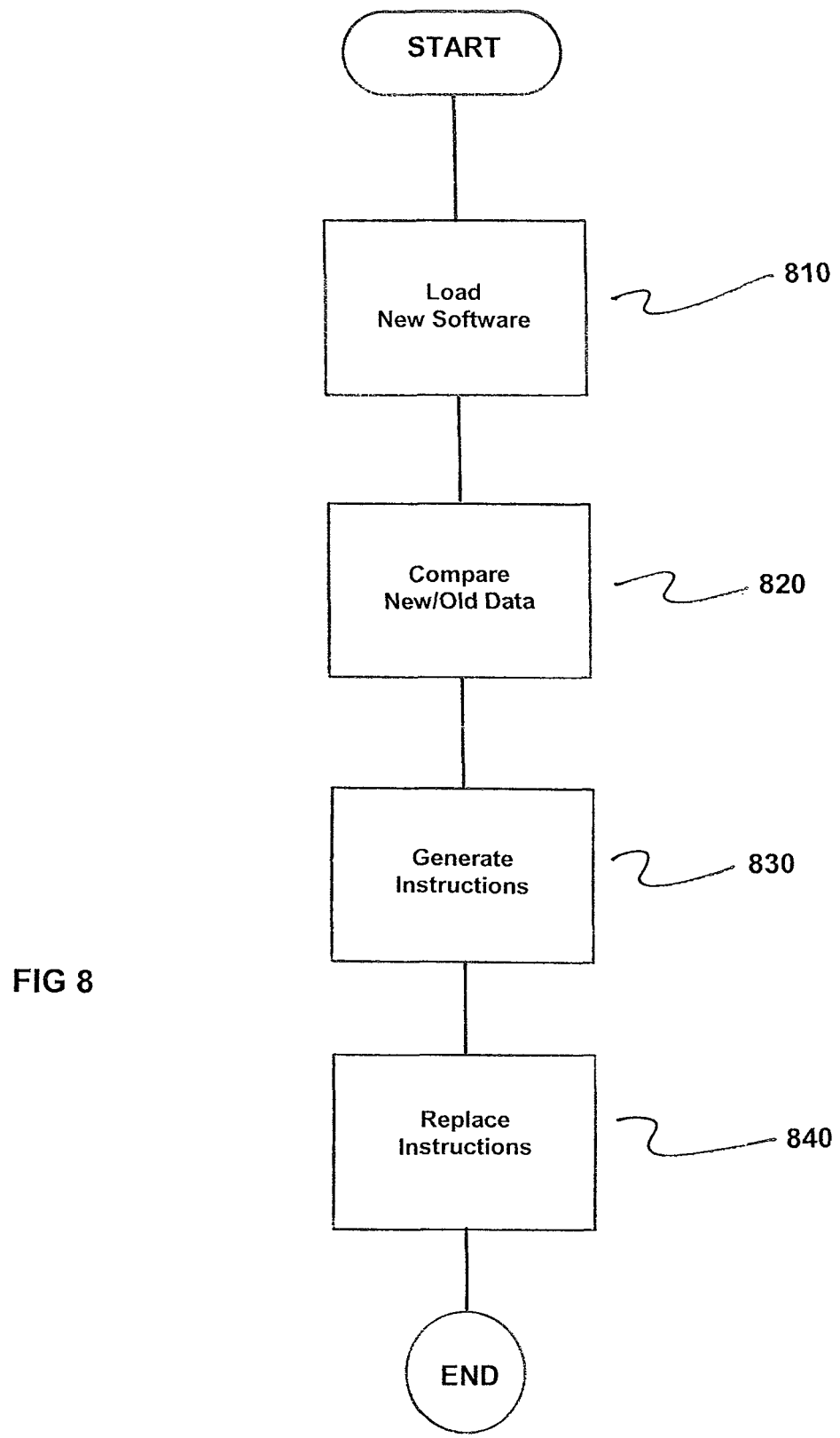
FIG. 8 is a flow chart of the method in accordance with an embodiment of the invention.

FIG. 8 is a flowchart of a method for operating an automation system having a memory in which a control program is stored as an automation solution and executed by a processing unit incorporated in the automation system, where the control program comprises a plurality of software modules invoked during execution of the computer program by a runtime group module incorporated in the control program. For replacing at least one software module comprises an old software module with a new software module at runtime of the control program, the method comprises comparing an old data area associated with the old software module with a new data area associated with the new software module, as indicated in step 810.

Program code instructions are generated for converting data for or from the old data area into data for or from the new data area, as indicated in step 820. The new software module and the new data area are loaded, as indicated in step 830. Next, a program code instruction for invoking the old software module in the runtime group module is replaced with program code instructions for invoking the generated program code instructions for data conversion and for invoking the new software module to replace at least one software module comprising the old software module with the new software module at runtime of the control program, as indicated in step 840.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A method for operating an automation system having a memory in which a control program is stored as an automation solution and executed by a processing unit incorporated in the automation system, said control program comprising a plurality of software modules invoked during execution of the control program by a runtime group module incorporated in the control program, wherein to replace at least one software module comprising an old software module with a new software module at runtime of the control program, the method comprising:

comparing an old data area associated with the old software module with a new data area associated with the new software module;

generating program code instructions for one of converting data for the old data area and converting data from the old data area into one of data for the old data area and data from the new data area;

loading the new software module and the new data area; and replacing a program code instruction for invoking the old software module in the runtime group module with program code instructions for invoking the generated program code instructions for data conversion and for invoking the new software module to replace at least one software module comprising the old software module with the new software module at runtime of the control program.

2. The method as claimed in claim 1, further comprising:
searching the control program for program code instructions related to the old data area, and
modifying program code instructions located in the search so that they relate to the new data area.

3. The method as claimed in claim 2, further comprising:
assigning a reference to the new software module which previously designated the old software module.

4. The method as claimed in claim 3, further comprising:
re-removing the program code instructions which were initially replaced in the runtime group module; and
inserting a program code instruction for invoking the new software module under a previous reference of the old software module in the runtime group module in place of the initially replaced program code instructions.

5. The method as claimed in claim 4, further comprising:
releasing memory areas occupied by the old software module and by the old data area in the memory.

6. The method as claimed in claim 2, further comprising:
copying the located program code instructions related to the old data area and which are not automatically changeable into program code instructions relating to the new data area into a task list.

7. The method as claimed in claim 6, wherein the task list is available for manual processing and modification of the located program code instructions relating to the old data area, and the new software module cannot be invoked in place of the old software module until the task list has been emptied.

8. The method as claimed in claim 1, wherein when a plurality of new software modules are substituted for a corresponding plurality of old software modules, each new software module from the plurality of new software modules is substituted in succession for a corresponding old software module, and wherein a replacement sequence within the plurality of new software modules is chosen in accordance with a respective call hierarchy for invocation of a respective old or new software module.

9. An automation system, comprising:
a memory; and
a processing unit configured to execute a control program which is loadable into the memory, the processor being configured to replace at least one software module comprising the old software module at runtime of the control program by:
comparing an old data area associated with the old software module with a new data area associated with the new software module;
generating program code instructions for one of converting data for the old data area and converting data from the old data area into one of data for the old data area and data from the new data area;
loading the new software module and the new data area; and
replacing a program code instruction for invoking the old software module in the runtime group module with program code instructions for invoking the generated program code instructions for data conversion and for invoking the new software module.

10. A process in which a computer executes instructions set forth in a computer program executing on a processor which, when used on the computer, causes a new software module to replace at least one software module comprising an old software module at runtime of a control program with a new software module, the computer program comprising:
program code for comparing an old data area associated with the old software module with a new data area associated with the new software module;
program code for generating program code instructions for one of converting data for the old data area and converting data from the old data area into one of data for the old data area and data from the new data area;
program code for loading the new software module and the new data area; and
program code for replacing a program code instruction for invoking the old software module in the runtime group module with program code instructions for invoking the generated program code instructions for data conversion and for invoking the new software module to replace at least one software module comprising the old software module at the runtime of the control program with the new software module to replace at least one software module comprising the old software module at the runtime of the control module with the new software module.

11. A non-transitory computer-readable storage medium encoded with a computer program that causes a new software module to replace at least one software module comprising an old software module at runtime of a control program with a new software module, wherein to replace at least one software module comprising the old software module at the runtime of the control program with a new software module, the computer program comprising:
program code for comparing an old data area associated with the old software module with a new data area associated with the new software module;
program code for generating program code instructions for one of converting data for the old data area and converting data from the old data area into one of data for the old data area and data from the new data area;
program code for loading the new software module and the new data area; and
program code for replacing a program code instruction for invoking the old software module in the runtime group module with program code instructions for invoking the generated program code instructions for data conversion and for invoking the new software module to replace at least one software module comprising the old software module at the runtime of the control program with the new software module.

* * * * *